US011831502B2

(12) United States Patent
Kleiba et al.

(10) Patent No.: US 11,831,502 B2
(45) Date of Patent: \*Nov. 28, 2023

(54) OPTIMIZED UPDATING OF A CLIENT APPLICATION

(71) Applicant: UAB 360 IT, Vilnius (LT)

(72) Inventors: Karolis Kleiba, Vilnius (LT);
Rimvydas Masiukas, Vilnius (LT);
Ignas Berenis, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 17/727,893

(22) Filed: Apr. 25, 2022

(65) Prior Publication Data
US 2023/0344711 A1   Oct. 26, 2023

Related U.S. Application Data

(63) Continuation of application No. 17/727,783, filed on Apr. 24, 2022, now Pat. No. 11,489,725.

(51) Int. Cl.
*H04L 41/082* (2022.01)
*H04L 41/08* (2022.01)
*H04L 41/0869* (2022.01)
*H04L 41/084* (2022.01)

(52) U.S. Cl.
CPC ........ *H04L 41/082* (2013.01); *H04L 41/0843* (2013.01); *H04L 41/0869* (2013.01); *H04L 41/0886* (2013.01)

(58) Field of Classification Search
None
See application file for complete search history.

(56) References Cited

U.S. PATENT DOCUMENTS

| | | | | |
|---|---|---|---|---|
| 5,867,494 A * | 2/1999 | Krishnaswamy | ........ | H04Q 3/64 379/114.15 |
| 5,867,495 A * | 2/1999 | Elliott | ..................... | H04L 65/80 379/93.07 |
| 6,363,411 B1 * | 3/2002 | Dugan | .................. | H04M 15/90 709/202 |
| 6,473,403 B1 * | 10/2002 | Bare | ....................... | H04L 45/26 370/236 |
| 6,779,030 B1 * | 8/2004 | Dugan | ................. | H04Q 3/0037 379/221.08 |
| 6,944,662 B2 * | 9/2005 | Devine | ................. | G06F 16/958 709/225 |
| 8,666,991 B2 * | 3/2014 | Peters | ................. | G06F 16/2228 707/758 |
| 8,719,386 B2 * | 5/2014 | Lyman | ................ | H04L 41/0866 709/227 |
| 9,607,085 B2 * | 3/2017 | Peters | ............... | G06F 16/24554 |
| 9,645,834 B2 | 5/2017 | Somani et al. | | |

(Continued)

*Primary Examiner* — Ranodhi Serrao
(74) *Attorney, Agent, or Firm* — The Pattani Law Group (57) ABSTRACT

A method including determining, by a user device, availability of a configuration file including updates to a current configuration of a client application installed on the user device; obtaining, by the user device, the configuration file based at least in part on determining that the configuration file including the updates is available; and selectively adopting, by the user device, the updates included in the configuration file to update the current configuration of the client application. Various other aspects are contemplated.

20 Claims, 6 Drawing Sheets

(56) References Cited

U.S. PATENT DOCUMENTS

| | | |
|---|---|---|
| 9,667,491 B2 | 5/2017 | Piekarski et al. |
| 10,078,650 B2* | 9/2018 | Dole .................. G06F 16/285 |
| 10,637,724 B2 | 4/2020 | Johnson et al. |
| 10,680,891 B2 | 6/2020 | Tomasson et al. |
| 10,775,974 B2 | 9/2020 | Schilling et al. |
| 10,805,153 B2 | 10/2020 | Wang et al. |
| 11,159,374 B2 | 10/2021 | Tomasson et al. |
| 11,237,845 B2 | 2/2022 | Somani et al. |
| 11,489,725 B1* | 11/2022 | Kleiba ................ H04L 41/0806 |
| 2002/0095399 A1* | 7/2002 | Devine ................ G06F 16/958 |
| 2002/0120741 A1* | 8/2002 | Webb .................. H04L 67/1008 709/225 |
| 2003/0188160 A1* | 10/2003 | Sunder ................ H04L 69/329 713/165 |
| 2004/0019679 A1* | 1/2004 | E ........................ H04L 69/329 709/226 |
| 2005/0021713 A1* | 1/2005 | Dugan ................ H04Q 3/0029 709/246 |
| 2006/0059253 A1* | 3/2006 | Goodman ............ G06Q 10/10 709/223 |
| 2006/0100011 A1* | 5/2006 | Morrow .............. G07F 17/3241 463/29 |
| 2006/0179432 A1* | 8/2006 | Walinga .................. H04L 43/12 717/176 |
| 2007/0220511 A1* | 9/2007 | Clarke .................... G06F 8/71 717/174 |
| 2009/0006543 A1* | 1/2009 | Smit ...................... G06F 16/951 707/E17.108 |
| 2009/0019514 A1* | 1/2009 | Hazlewood ......... H04L 63/0281 726/1 |
| 2010/0174807 A1* | 7/2010 | Lyman ................ H04L 41/0866 709/221 |
| 2012/0150819 A1* | 6/2012 | Lindahl ................ G06F 16/273 707/687 |
| 2012/0158694 A1* | 6/2012 | Skrenta ................ G06F 16/273 707/706 |
| 2012/0158800 A1* | 6/2012 | Peters ............... G06F 16/24554 707/812 |
| 2013/0311990 A1* | 11/2013 | Tang ................... G06F 9/45533 718/1 |
| 2016/0057000 A1* | 2/2016 | Piekarski ................ H04L 43/10 709/221 |
| 2016/0188722 A1* | 6/2016 | Skrenta ............ G06F 16/24554 707/706 |
| 2017/0249483 A1* | 8/2017 | Kawazu .................. G06F 21/64 |
| 2017/0272316 A1 | 9/2017 | Johnson et al. |
| 2019/0158353 A1 | 5/2019 | Johnson et al. |
| 2019/0238403 A1 | 8/2019 | Wang et al. |
| 2019/0268218 A1 | 8/2019 | Tomasson et al. |
| 2020/0050330 A1 | 2/2020 | Schilling et al. |
| 2020/0127891 A9 | 4/2020 | Johnson et al. |
| 2020/0295987 A1 | 9/2020 | Tomasson et al. |
| 2021/0119862 A1 | 4/2021 | Wang et al. |
| 2021/0224132 A1 | 7/2021 | Barsalou |
| 2021/0328864 A1 | 10/2021 | Hashimoto et al. |
| 2022/0019446 A1* | 1/2022 | Maloney ................ G06F 40/30 |

\* cited by examiner

OPTIMIZED UPDATING OF A CLIENT APPLICATION

CROSS REFERENCE

This application is a continuation of U.S. Non-Provisional patent application Ser. No. 17/727,783, filed on Apr. 24, 2022, and titled "Optimized Updating Of A Client Application," the entire contents of which are incorporated herein by reference.

FIELD OF DISCLOSURE

Aspects of the present disclosure generally relate to network operations, and more particularly to optimized updating of a client application.

BACKGROUND

A service provider may operate a network to provide network services to user devices. Such network services may include, for example, virtual private network (VPN) services, mesh network services, data storage services, or a combination thereof. To facilitate provision of the network services, the service provider may configure and provide client applications to be installed on the user devices. The client applications may enable the user devices to perform functions associated with obtaining the network services. During provision of the network services, the service provider may conduct various network operations, including operations associated with updating configurations associated with the client applications.

SUMMARY

In one aspect, the present disclosure contemplates a method including configuring, by an infrastructure device, a user device to determine availability of a configuration file including updates to a current configuration of a client application installed on the user device; configuring, by the infrastructure device, the user device to obtain the configuration file based at least in part on determining that the configuration file including the updates is available; and configuring, by the infrastructure device, the user device to selectively adopt the updates included in the configuration file to update the current configuration of the client application.

In another aspect, the present disclosure contemplates a device including a memory and a processor communicatively coupled to the memory, the memory and the processor being configured to: configure a user device to determine availability of a configuration file including updates to a current configuration of a client application installed on the user device; configure the user device to obtain the configuration file based at least in part on determining that the configuration file including the updates is available; and configure the user device to selectively adopt the updates included in the configuration file to update the current configuration of the client application.

In another aspect, the present disclosure contemplates a non-transitory computer readable medium storing instructions, which when executed by a processor associated with a device, cause the processor to: configure a user device to determine availability of a configuration file including updates to a current configuration of a client application installed on the user device; configure the user device to obtain the configuration file based at least in part on determining that the configuration file including the updates is available; and configure the user device to selectively adopt the updates included in the configuration file to update the current configuration of the client application.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, and/or interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances, the same reference numbers are used throughout the drawings to refer to the same or like parts.

Figure 1:
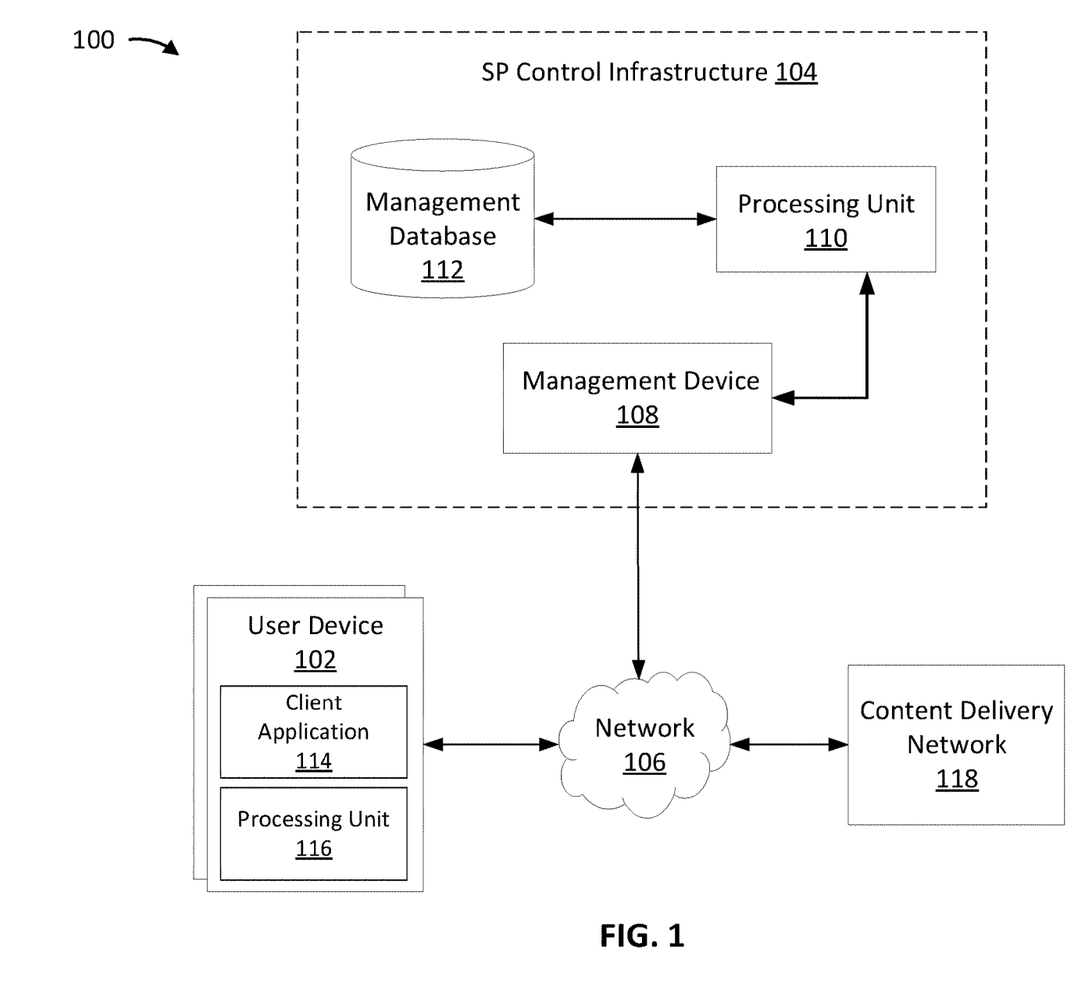
FIG. 1 is an illustration of an example system associated with optimized updating of a client application, according to various aspects of the present disclosure.

FIG. 1 is an illustration of an example 100 associated with optimized updating of a client application, according to various aspects of the present disclosure. Example 100 shows an architectural depiction of included components. In some aspects, the components may include one or more user devices 102, a service provider (SP) control infrastructure 104, and a content delivery network 118 in communication with each other for purposes of providing, facilitating, and/or obtaining network services. The one or more user devices 102, the SP control infrastructure 104, and the content delivery network 118 may communicate with each other over a network 106. The SP control infrastructure 104 may include a management device 108, a processing unit 110, and a management database 112. The SP control infrastructure 104 may be owned and operated by a network service provider providing various network services to the one or more user devices 102. The management device 108 may be communicatively coupled to the processing unit 110 and may be configured to communicate with the one or more user devices 102 and the content delivery network 118. Additionally, the processing unit 110 may be communicatively coupled to the management database 112, which may be capable of storing data associated with providing the network services.

A user device 102, from among the one or more user devices 102, may include a client application 114 and a processing unit 116. The user device 102 may receive the client application 114 from the management device 108. In an example, a first user device may communicate with the management device 108 to receive a first (instance of a) client application 114, a second user device may communicate with the management device 108 to receive a second (instance of a) client application 114, and so on. In some aspects, the management device 108 may configure the client application 114 to enable optimized updating of the client application, as discussed herein. In some aspects, the user device 102 may utilize the client application 114 to communicate (e.g., transmit and/or receive) with the management device 108 and with the content delivery network 118. In some aspects, the client application 114 may enable the one or more user devices 102 to obtain, for example, virtual private network (VPN) services, mesh network services, data storage services, or a combination thereof.

The user device 102 may be a physical computing device capable of hosting applications (e.g., client applications 114, third-party applications, etc.) and of connecting to the network 106. The user device 102 may include, for example, a laptop, a mobile phone, a tablet computer, a desktop computer, a smart device, a router, or a combination thereof. In some aspects, the user device 102 may include, for example, an Internet-of-Things (IoT) device such as a MSP smart home appliance, a smart home security system, an autonomous vehicle, a smart health monitor, smart factory equipment, a wireless inventory tracker, a biometric cyber security scanner, or a combination thereof.

The network 106 may be any wired or wireless digital telecommunication network that permits several nodes to share and access resources. In some aspects, the network 106 may include a combination of one or more of, for example, a local-area network (LAN), a wide-area network (WAN), a campus-area network (CAN), a metropolitan-area network (MAN), a home-area network (HAN), Internet, Intranet, Extranet, and Internetwork.

The processing unit 110 may be a logical unit including a logical component configured to perform complex operations associated with computing, for example, numerical weights related to various factors associated with providing the network services. The processing unit 110 included in the SP control infrastructure 104 may be configured to configure the management device 108 to provide the network services to the user device 102.

The SP control infrastructure 104 may include a combination of hardware and software components that enable provision of network services to the user device 102. The SP control infrastructure 104 may interface with the user device 102 via an application programming interface (API) (not shown), which may include one or more endpoints to a defined request-response message system. In some aspects, the API may be configured to receive, via the network 106, a connection request from the user device 102 to establish a connection with the SP control infrastructure 104 for purposes of obtaining the network services. The connection request may include a request to obtain and install client applications 114 and/or to receive the network services.

The API may further be configured to handle the connection request(s) by mediating the authentication request. For instance, the API may receive from the user device 102 credentials including, for example, a unique combination of a user ID and password for purposes of authenticating the user device 102. In another example, the credentials may include a unique validation code known to an authentic user. The API may provide the received credentials to the processing unit 110 for verification. The processing unit 110 may communicate with the management database 112 to authenticate the user device 102.

The management database 112 may include a structured repository of valid credentials belonging to authentic users. In one example, the structured repository may include one or more tables containing valid unique combinations of user IDs and passwords belonging to authentic users. In another example, the structured repository may include one or more tables containing valid unique validation codes associated with authentic users. The network services provider may add or delete such valid unique combinations of user IDs and passwords from the structured repository at any time. Based at least in part on receiving the credentials from the API, the processing unit 110 may verify the received credentials by matching the received credentials with the valid credentials stored in the structured repository. In some aspects, the management database 112 and the processing unit 110 may authenticate the user device 102 when the received credentials match at least one of the valid credentials. In this case, the network service provider may provide the network security services to the user device 102. When the received credentials fail to match at least one of the valid credentials, the management database 112 and the processing unit 110 may fail to authenticate the user device 102. In this case, the network service provider may decline to provide the network services to the user device 102. Additionally, as discussed below in further detail, the management database 112 may store data associated with providing the network services.

When the user device 102 is authenticated, the user device 102 may initiate a connection with the SP control infrastructure 104 for obtaining the network services. The processing unit 110 may utilize the management device 108 to transmit information associated with the network services to the user device 102.

The content delivery network 118 may include a geographically distributed network of proxy servers and associated data centers, which may facilitate global availability of content to user devices. In some aspects, the network service provider may own and operate the content delivery network 118 to distribute content to the user devices as part of providing the network services. Alternatively, the network service provider may rent the content delivery network 118 from an owner and/or operator thereof to distribute content to the user devices as part of providing the network services. In some aspects, The content delivery network 118 may also be referred to as a content distribution network.

Figure 6:
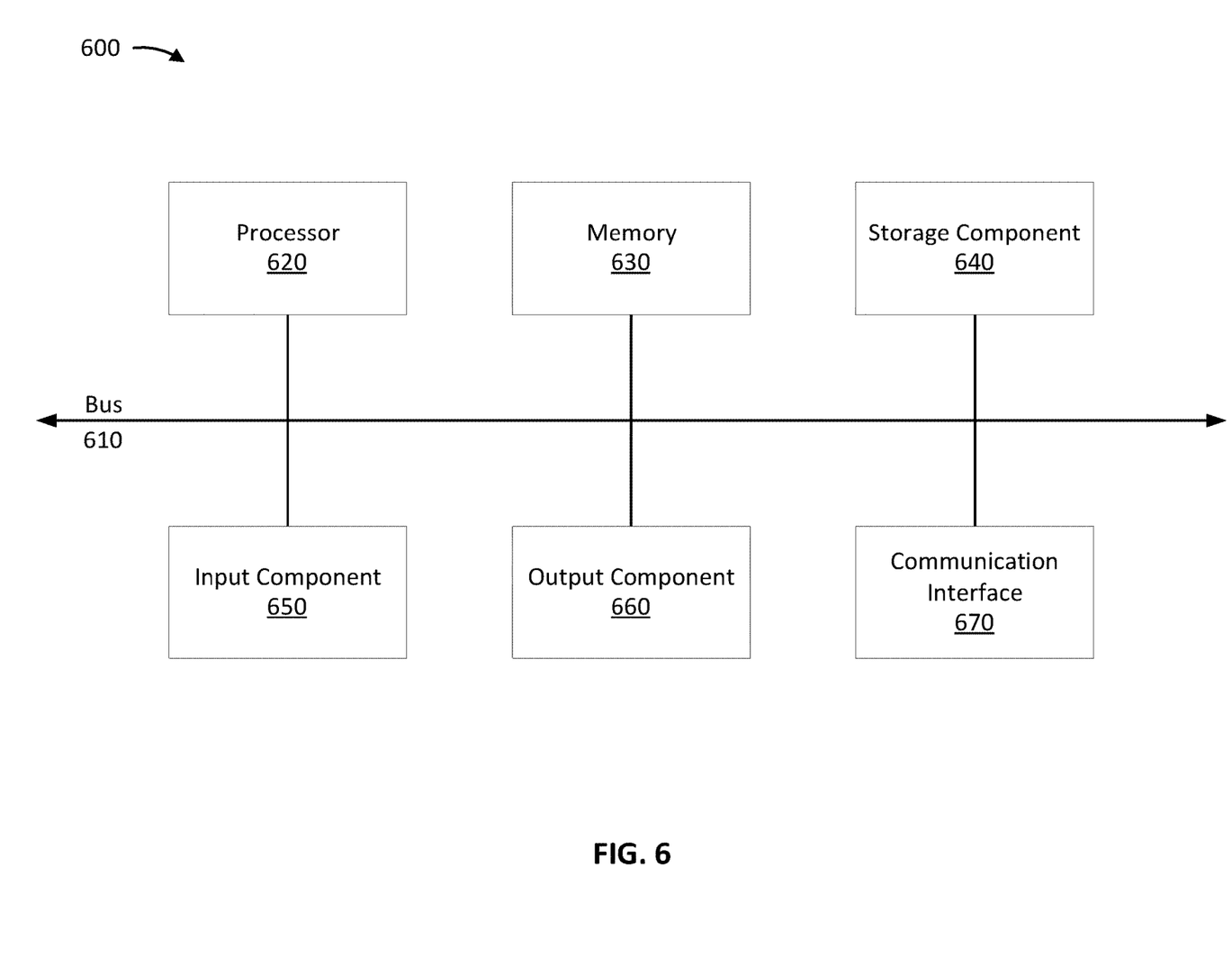
FIG. 6 is an illustration of example devices associated with optimized updating of a client application, according to various aspects of the present disclosure.

One or more components (e.g., management device 108, processing unit 110, and/or management database 112, client application 114, processing unit 116, content delivery network 118) shown in FIG. 1 may further be associated with a controller/processor, a memory, a communication interface, or a combination thereof (e.g., FIG. 6). For instance, the one or more components may include or may be included in a controller/processor, a memory, or a combination thereof. In some aspects, the one or more components included in the SP control infrastructure 104 may be separate and distinct from each other. Alternatively, in some aspects, the one or more components included in the SP control infrastructure 104 may be combined with one or more of the other components. In some aspects, the one or more components included in the SP control infrastructure 104 and/or the user device 102 may be local with respect to each other. Alternatively, in some aspects, one or more components included in the SP control infrastructure 104 and/or the user device 102 may be located remotely with respect to one or more of other components included in the SP control infrastructure 104 and/or the user device 102. Additionally, or alternatively, the one or more components included in the SP control infrastructure 104 and/or the user device 102 may be implemented at least in part as software stored in a memory for execution by a processor. For example, a component (or a portion of a component) may be implemented as instructions or code stored in a non-transitory computer-readable medium and executable by a controller or a processor to perform the functions or operations of the component. Additionally, the one or more components may be configured to perform one or more functions described as being performed by another set of components shown in FIG. 1.

As indicated above, FIG. 1 is provided as an example. Other examples may differ from what is described with regard to FIG. 1.

A service provider (e.g., SP control infrastructure 104) may provide network services to user devices. Such network services may include, for example, virtual private network (VPN) services, mesh network services, data storage services, or a combination thereof. To facilitate provision of the network services, the service provider may initially configure and provide a client application to be respectively installed on the user devices. The client application may enable the user devices to perform functions associated with obtaining the network services.

During provision of the network services, the service provider may update an initial configuration of the client application. In an example, the service provider may update the initial configuration to introduce new features in the client application. In another example, the service provider may update the initial configuration to improve performance of existing features associated with, for example, security, user interface, etc. in the client application. In yet another example, the service provider may update the initial configuration to fix discovered errors and/or bugs in the client application.

To update the initial configuration, the service provider may newly configure and provide a new version of the client application. The user devices may obtain and install the new version of the client application to continue receiving the network services.

In some cases, after installing the new version of the client application, some user devices may fail to adequately receive the network services. For instance, the new configuration in the new version of the client application may not be adopted by all operating systems being utilized by the user devices. This is because the new configuration may set a given value for a given parameter while different operating systems may need to be updated using different values for the given parameter. In an example, a first user device may utilize a first operating system (e.g., Android), a second user device may utilize a second operating system (e.g., Windows), a third user device may utilize a third operating system (e.g., iOS and/or MAC OS), and so on. The new configuration in the new version may be adopted by, for example, the second operating system and may not be adopted by, for example, the first operating system and/or the third operating system. In this case, the first user device and/or the third user device may fail to receive the network services in accordance with the new configuration. As a result, the first user device and/or the third user device may fail to receive the network services in accordance with the introduced new features, improved existing features, and/or fixed errors and/or bugs.

Further, even the second user device may fail to adequately receive the network services because a version associated with the second operating system may not be able to fully adopt the new configuration in the new version. This is because the new configuration may set the given value for the given parameter while different versions associated with the second operating system may need to be updated using different values for the given parameter. As a result, the new configuration in the new version may be adopted by a recent version (e.g., Windows 10 or 11) of the second operating system and may not be adopted by a previous version (e.g., Windows 7) of the second operating system. In this case, a user device utilizing the previous version of the second operating system may fail to receive the network services in accordance with the new configuration. As a result, the user device utilizing the previous version of the second operating system may fail to receive the network services in accordance with the introduced new features, improved existing features, and/or fixed errors and/or bugs.

To ensure that all user devices adequately receive the network services, the service provider may provide respective editions of the new version of the client application. Such respective editions may include editions that may be adopted by all operating systems and also by all versions (e.g., recent and previous) of operating systems being utilized by the user devices. Providing such perspective editions may be onerous and inefficient, requiring the service provider to inefficiently expend network resources (computational resources, network bandwidth, management resources, processing resources, memory resources, power consumption, or the like).

Further, the service provider may employ a remote configuration service to enable the user devices to configure the new version of the client application. In an example, the remote configuration service may provide a backend application program interface (API) to enable the user devices to configure the new version of the client application in accordance with the new configuration.

Employing the remote configuration service may be expensive and may require the service provider to expend additional network resources. In an example, because the remote configuration service may limit implementation of the new configuration to a limited number of parameters and/or conditions having a limited number of characters, the service provider may have to expend network resources to provide multiple instances of the updates. In another example, because the remote configuration service may not be compatible with all operating systems, the service provider may have to provide respective versions for each operating system and/or each version of an operating system being utilized by the user devices that are compatible with the remote configuration service. In yet another example, because communication between the remote configuration service and a user device may be unsecure (e.g., unencrypted), the service provider may have to expend resources to secure communications between the remote configuration service and all user devices. In yet another example, because the remote configuration service may be blocked from operating in certain geographic locations (e.g., China), the service provider may have to expend resources to provide the new version of the client application in such geographical locations. In yet another example, the service provider may fail to provide the services and may expend additional resources when the remote configuration service is out-of-order due to, for example, being overloaded, hacked, experiencing a power outage, experiencing a malfunction, or the like.

Various aspects of systems and techniques discussed in the present disclosure enable optimized updating of a client application. As shown in FIG. 1, a service provider (e.g., SP control infrastructure) may provide network services to one or more user devices. In some aspects, the service provider may configure a management device to enable the optimized updating of the client application, as discussed herein. In an example, the management device may be configured to determine and provide a configuration file that includes updates to a current configuration of the client application installed on the user device. Further, the management device may configure the client application to analyze the configuration file and selectively adopt the updates included in the configuration file. The updates may include respective updates associated with all operating systems and with all versions of operating systems being utilized by user devices such that all operating systems and all versions of the operating systems may adopt the respective updates. In an example, the client application on a given user device utilizing a given operating system may analyze the configuration file to determine applicable updates associated with a given operating system and to adopt such applicable updates. In some aspects, the client application may analyze a version associated with the installed instance of the client application to determine whether to adopt such applicable updates. In this way, by initially configuring the client application with the ability to analyze the configuration file and to adopt applicable updates, the service provider may avoid employing a remote configuration service. Further, by providing a single configuration file including the respective updates that may be adopted by the client applications on user devices utilizing different operating systems and/or different versions of an operating system, the service provider may avoid the onerous task of providing respective editions of the new version of the client application. Furthermore, by providing the single configuration file including applicable updates that can be adopted by the client application, the service provider may avoid providing entire new versions of the client application that need to be installed and configured. As a result, the service provider may conserve and efficiently utilize network resources (computational resources, network bandwidth, management resources, processing resources, memory resources, power consumption, or the like) for more suitable tasks associated with providing the network services.

In some aspects, a processor (e.g., processing unit 110, processor 620, etc.) may configure a user device to determine availability of a configuration file including updates to a current configuration of a client application installed on the user device; configure the user device to obtain the configuration file based at least in part on determining that the configuration file including the updates is available; and configure the user device to selectively adopt the updates included in the configuration file to update the current configuration of the client application.

Figure 2:
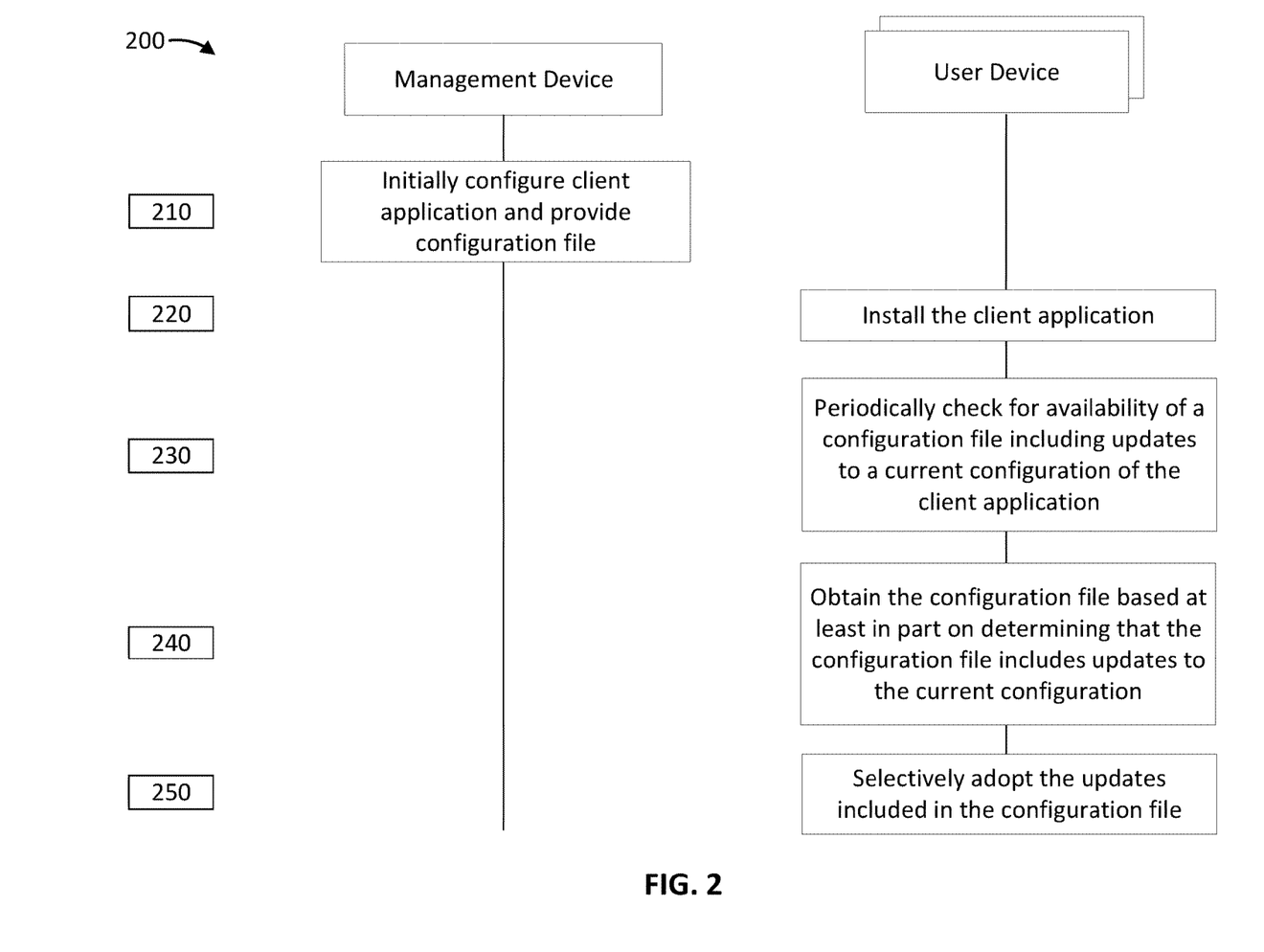
FIG. 2 is an illustration of an example flow associated with optimized updating of a client application, according to various aspects of the present disclosure.

FIG. 2 is an illustration of an example flow 200 associated with optimized updating of a client application, according to various aspects of the present disclosure. The example flow 200 may include a management device (e.g., management device 108) in communication with one or more user devices (e.g., user device 102). In some aspects, the management device and the one or more user devices may communicate with each other over a network (e.g., network 106). The one or more user devices may be associated with the management device for purposes of, for example, obtaining network services. To provide the network services, an SP control infrastructure (e.g., SP control infrastructure 104) may configure the management device to configure and provide respective instances of a client application to be utilized by the one or more user devices. The management device may configure the client application to enable the one or more user devices to perform the optimized updating of the client application (e.g., itself), as discussed herein.

In some aspects, the client application may enable a user device, from among the one or more user devices, to receive information to be processed by the client application and/or by the management device. The client application may include a graphical user interface to receive the information via a local input interface (e.g., touch screen, keyboard, mouse, pointer, etc.) associated with the user device. The information may be received via text input or via a selection from among a plurality of options (e.g., pull down menu, etc.). In some aspects, the client application may activate and/or enable, at a time associated with transmitting a communication, the graphical interface for receiving the information. For instance, the client application may cause a screen (e.g., local screen) associated with the user device to display, for example, a pop-up message to request entry of the information. Further, the client application may enable transmission of at least a portion of the information to the SP control infrastructure 104 and/or another device (e.g., content delivery network). In some aspects, the client application may utilize a processing unit (e.g., processing unit 116, processor 620) associated with the user device to perform processes/operations associated with obtaining the network services.

As shown by reference numeral 210, the management device may configure the client application to facilitate provision of the network services to the user device. In some aspects, configuring the client application may include configuring the client application to update parameters associated with a current configuration (e.g., configuration of a currently installed version) of the client application. The management device may configure the client application to update the current configuration by, for example, adding new parameters and/or modifying existing parameters associated with obtaining the network services. In an example, the configuration may enable the client application to add new parameters associated with introducing new features, to modify parameters associated with fixing discovered errors and/or bugs, and/or to modify parameters associated with existing features such as, for example, security features, user interface features, or a combination thereof.

The management device may determine and make available updates to the current configuration in a configuration file. The configuration file may include new and/or updated parameters for adding and/or modifying parameters associated with the current configuration. The management device may store the configuration file in association with a stored hash value in, for example, a content delivery network (e.g., content delivery network 118) associated with the management device. The management device may calculate the stored hash value based at least in part on information included in the configuration file. Additionally, to secure the configuration file from malicious tampering, the management device may sign the configuration file and may utilize an encryption cryptographic key to encrypt the configuration file.

As discussed in further detail with respect to FIG. 2 (e.g., blocks 230-250), the management device may configure the client application to periodically check for availability of a configuration file including updates to the current configuration of the client application, to obtain the configuration file based at least in part on determining that the configuration file includes updates to the current configuration, to selectively adopt the updates included in the configuration file, and/or to continue to periodically check for availability of the configuration file.

As shown by reference numeral 220, the user device may obtain and install the configured client application. In some aspects, the user device may obtain the client application from a storage device (e.g., content delivery network, infrastructure database, etc.) associated with the SP control infrastructure and/or the management device. In some aspects, the management device may transmit, and the user device may receive, communication information (e.g., internet protocol (IP) address) associated with the storage device to enable the user device to access the database for obtaining the configuration file. Based at least in part on installing the client application, the user device may utilize an associated processor (e.g., processing unit 116, processor 620) to execute the client application.

For instance, as shown by reference numeral 230, the user device may periodically check for availability of the configuration file including updates to the current configuration of the client application. A time interval associated with periodically checking or the update may be, for example, 1 minute, 5 minutes, 30 minutes, 6 hours, 15 hours, 24 hours, 1 week, etc.

In some aspects, in accordance with the configuration of the client application, the user device may periodically access the publicly known database to determine whether the configuration file including the updates is available. In an example, the user device may access the publicly known database to access the stored hash value. Further, the user device may calculate a hash value utilizing information associated with the current configuration of the client application installed on the user device. The user device may determine the calculated hash value based at least in part on the information associated with the current configuration. When the user device has not previously updated the current configuration, the current configuration of the client application may be the initial configuration of the client application.

Further, the user device may compare the calculated hash value with the stored hash value. When the user device determines that the calculated hash value matches (e.g., is the same as) the stored hash value, the user device may determine that the information in the configuration file stored in association with the stored hash value is the same as the information associated with the current configuration. In this case, the user device may determine that the configuration file including updates to the current configuration is not available. As a result, the user device may refrain from obtaining (e.g., downloading) the configuration file. Alternatively, when the user device determines that the calculated hash value fails to match the stored hash value, the user device may determine that the information in the configuration file stored in association with the stored hash value is different from the information associated with the current configuration. In this case, the user device may determine that the configuration file including updates to the current configuration is available.

Based at least in part on determining that the configuration file including updates to the current configuration is available, as shown by reference numeral 240, the user device may obtain (e.g., download) the configuration file from the content delivery network. When the downloaded configuration file is encrypted to secure the configuration file from malicious tampering, the user device may utilize a decryption cryptographic key to decrypt the configuration file. In some aspects, the management device may include the decryption cryptographic key within configuration of the client application. Further, the user device may determine whether the configuration file is signed by the management device (or another device associated with the SP control infrastructure). Based at least in part on examining a signature associated with the configuration file, the user device may determine that the configuration file was signed by a device other than the management device (or another device associated with the SP control infrastructure). In this case, the user device may determine that the configuration file has been tampered with, and may discard the configuration file. Alternatively, the user device may determine that the configuration file was signed by the management device (or another device associated with the SP control infrastructure). In this case, the user device may proceed to determine the updates included in the configuration file.

For instance, as shown by reference numeral 250, the user device may proceed to selectively adopt the updates included in the configuration file. The configuration file may include the update information including respective updates associated with all operating systems and with all versions of operating systems being utilized by user devices. In an example, the update information may include a first update to be adopted by a first operating system (e.g., Android), a second update to be adopted by a second operating system (e.g., Windows), a third update to be adopted by a third operating system (e.g., iOS and/or MAC OS), and so on. In some aspects, the second update may include an update to be adopted by a recent version (e.g., Windows 10 or 11) of the second operating system and another update to be adopted by a previous version (e.g., Windows 7) of the second operating system. As a result, the update information may allow user devices utilizing different operating systems and/or different versions of the operating systems to selectively adopt the respective updates to update current configurations of the respective client applications installed on the user devices.

Each update in the update information may indicate one or more factors to enable the user device to selectively adopt the update. In an example, an update may indicate one or more of a version of the client application associated with the update, an operating system associated with the update, a version of an operating system associated with the update, an architecture of a processor associated with the update, etc. While selectively adopting the updates, the user device may analyze the update information and determine whether an update is to be adopted by the user device. For instance, for a given update, the user device may match the one or more factors indicated by the given update with corresponding factors associated with the user device. When the user device determines that the one or more factors indicated by the given update (e.g., version of the client application, operating system, the version of the operating system, architecture of the processor) match the corresponding factors associated with the user device, the user device may select to adopt the given update. In an example, when the given update indicates an operating system, and the user device determines that the user device is utilizing the same operating system as the indicated operating system, the user device may select to adopt the given update. Similarly, when the given update indicates a version of an operating system, and the user device determines that the user device is utilizing the same version of the operating system as the indicated version of the operating system, the user device may select to adopt the given update. Alternatively, when the user device determines that the one or more factors indicated by the given update fail to match the corresponding factors associated with the user device, the user device may select to refrain from adopting the given update.

In some aspects, adopting an update may include updating (e.g., setting or modifying) a value of a parameter associated with configuration of the client application. The parameter may be associated with, for example, introducing a new feature, improving performance of an existing feature, fixing a discovered error and/or bug, etc. Based at least in part on updating the value, the current configuration of the client application may be updated to an updated configuration. As a result, the user device may execute the client application according to the updated configuration.

While operating according to the updated configuration, the user device may continue to periodically check for availability of a configuration file including updates to the current configuration (e.g., updated configuration) of the client application, to obtain the configuration file based at least in part on determining that the configuration file includes updates to the current configuration (e.g., updated configuration), to selectively adopt the updates included in the configuration file, and to continue to periodically check for availability of the configuration file.

In this way, by initially configuring the client application with the ability to analyze the configuration file and to adopt applicable updates, the service provider may avoid employing a remote configuration service. Further, by providing a single configuration file including the respective updates that may be adopted by the client applications on user devices utilizing different operating systems and/or different versions of an operating system, the service provider may avoid the onerous task of providing respective editions of the new version of the client application. Furthermore, by providing the single configuration file including applicable updates that can be adopted by the client application, the service provider may avoid providing entire new versions of the client application that need to be installed and configured. As a result, the service provider may conserve and efficiently utilize network resources (computational resources, network bandwidth, management resources, processing resources, memory resources, power consumption, or the like) for more suitable tasks associated with providing the network services.

initially configuring the client application with the ability to analyze the configuration file and to adopt applicable updates, as discussed above, is different from updating of applications (e.g., web browsers, social media applications, etc.) because such applications utilize remote configuration services providing remote configuration APIs. Resource-intensive communication is carried out between the application and the remote configuration APIs.

Figure 3:
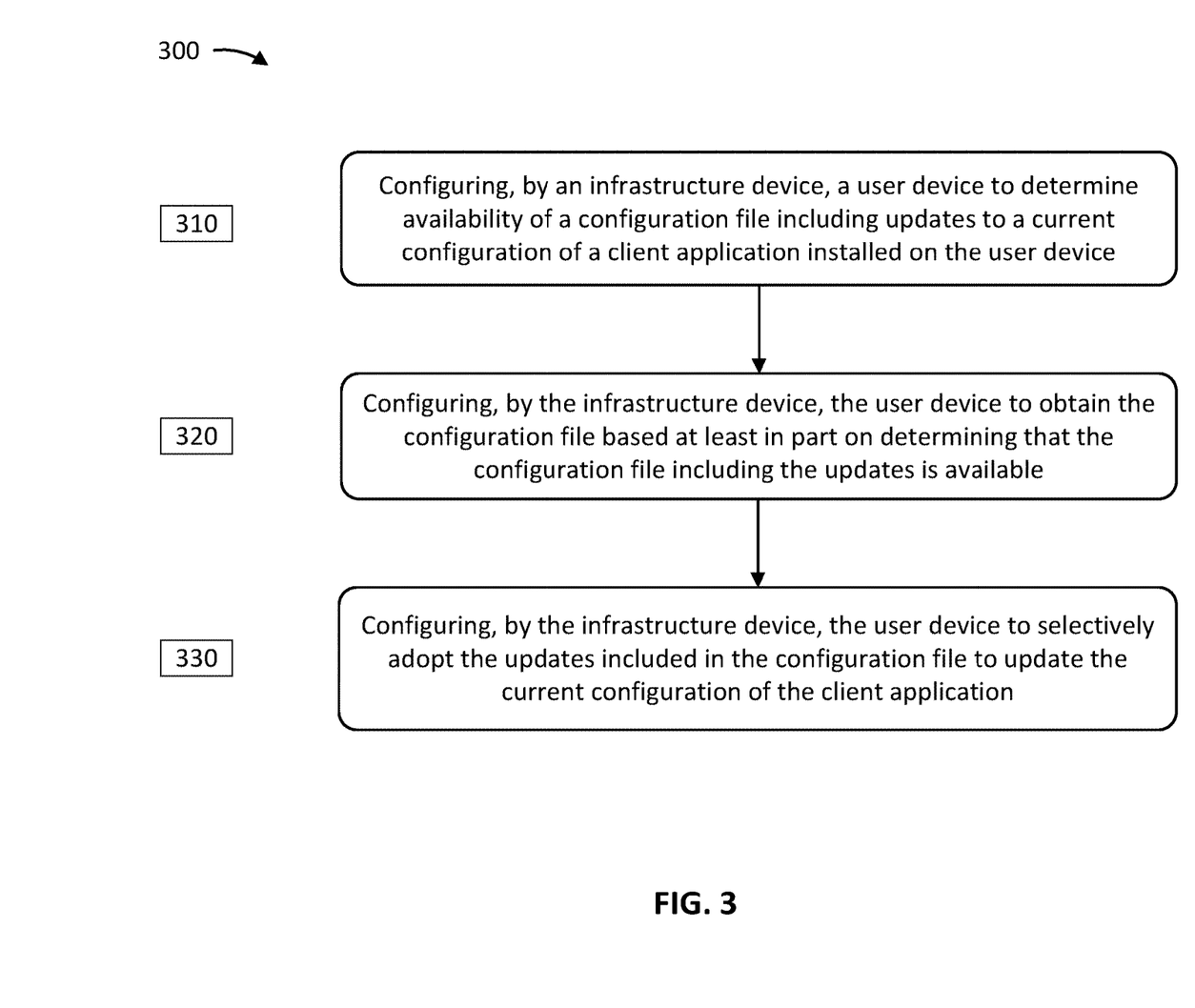
FIG. 3 is an illustration of an example process associated with optimized updating of a client application, according to various aspects of the present disclosure.

FIG. 3 is an illustration of an example process 300 associated with optimized updating of a client application, according to various aspects of the present disclosure. In some aspects, the process 300 may be performed by a memory and/or processor (e.g., processing unit 110, processor 620) associated with an infrastructure device (e.g., management device 108). As shown by reference numeral 310, process 300 may include configuring, by an infrastructure device, a user device to determine availability of a configuration file including updates to a current configuration of a client application installed on the user device. For instance, the infrastructure device may utilize the associated memory and/or processor to configure a user device to determine availability of a configuration file including updates to a current configuration of a client application installed on the user device, as discussed elsewhere herein.

As shown by reference numeral 320, process 300 may include configuring, by the infrastructure device, the user device to obtain the configuration file based at least in part on determining that the configuration file including the updates is available. For instance, the infrastructure device may utilize the associated memory and/or processor to configure the user device to obtain the configuration file based at least in part on determining that the configuration file including the updates is available, as discussed elsewhere herein.

As shown by reference numeral 330, process 300 may include configuring, by the infrastructure device, the user device to selectively adopt the updates included in the configuration file to update the current configuration of the client application. For instance, the user device may utilize the associated memory and/or processor to configure the user device to selectively adopt the updates included in the configuration file to update the current configuration of the client application, as discussed elsewhere herein.

Process 300 may include additional aspects, such as any single aspect or any combination of aspects described below and/or in connection with one or more other processes described elsewhere herein.

In a first aspect, in process 300, the updates include respective updates associated with respective operating systems utilized by user devices associated with the infrastructure device.

In a second aspect, alone or in combination with the first aspect, in process 300, configuring the user device to check for availability of the configuration file includes configuring the user device to periodically check for availability of the configuration file.

In a third aspect, alone or in combination with the first through second aspects, in process 300, configuring the user device to check for availability of the configuration file includes configuring the user device to compare a calculated hash value associated with the current configuration of the client application with a stored hash value associated with the configuration file.

In a fourth aspect, alone or in combination with the first through third aspects, process 300 may include configuring the user device to determine that the configuration file is available based at least in part on determining that a calculated hash value associated with the current configuration of the client application fails to match a stored hash value associated with the configuration file.

In a fifth aspect, alone or in combination with the first through fourth aspects, in process 300, configuring the user device to selectively adopt the updates includes configuring the user device to adopt an update associated with an operating system being utilized by the user device.

In a sixth aspect, alone or in combination with the first through fifth aspects, in process 300, configuring the user device to selectively adopt the updates includes configuring the user device to add or modify a parameter associated with the current configuration of the client application.

Although FIG. 3 shows example blocks of the process, in some aspects, the process may include additional blocks, fewer blocks, different blocks, or differently arranged blocks than those depicted in FIG. 3. Additionally, or alternatively, two or more of the blocks of the process may be performed in parallel.

As indicated above, FIG. 3 is provided as an example. Other examples may differ from what is described with regard to FIG. 3.

Figure 4:
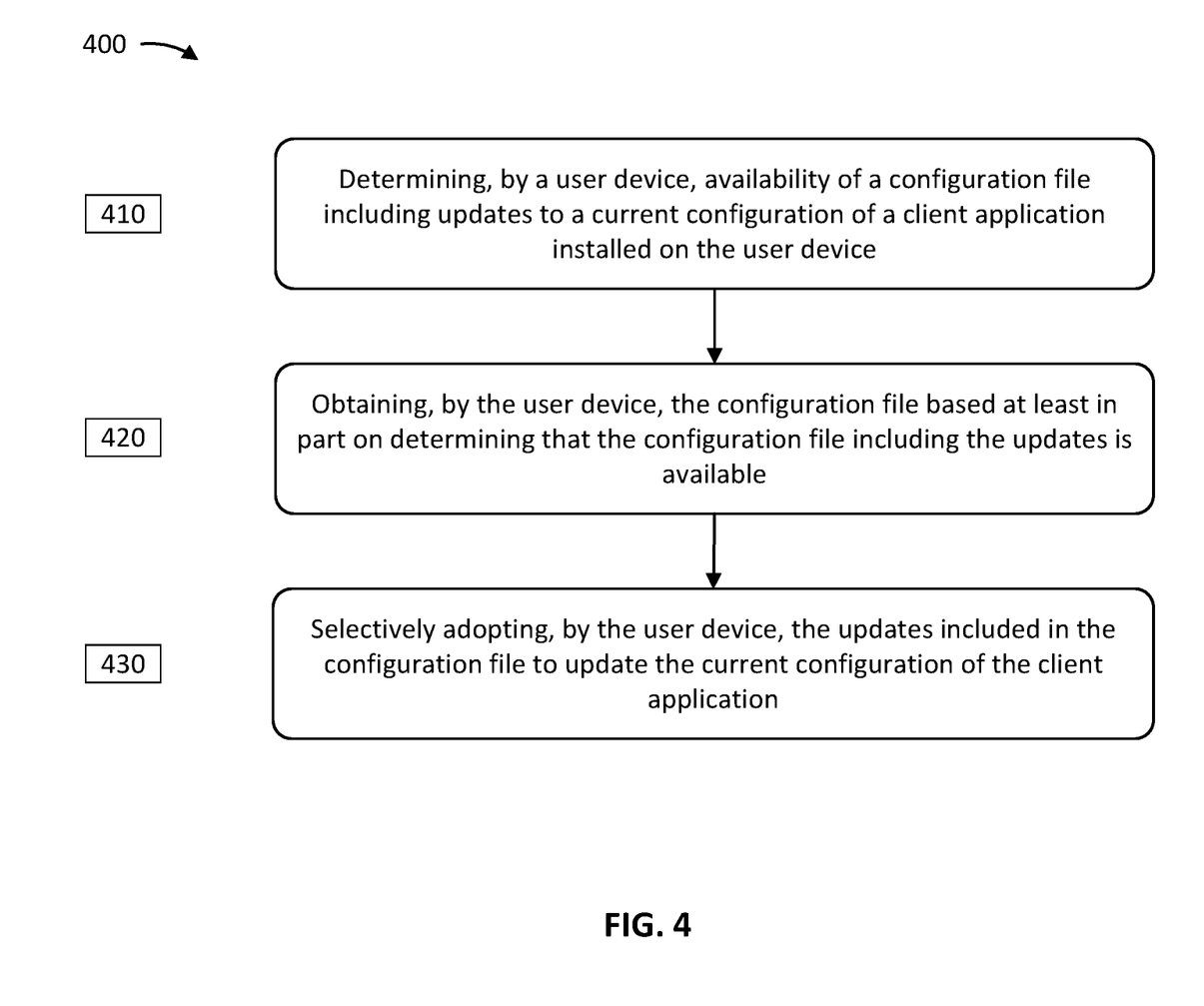
FIG. 4 is an illustration of an example process associated with optimized updating of a client application, according to various aspects of the present disclosure.

FIG. 4 is an illustration of an example process 400 associated with optimized updating of a client application, according to various aspects of the present disclosure. In some aspects, the process 400 may be performed by one or more memories and/or processors/controllers (e.g., processing unit 116, processor 620) associated with a user device (e.g., user device 102). As shown by reference numeral 410, process 400 may include determining, by a user device, availability of a configuration file including updates to a current configuration of a client application installed on the user device. For instance, the user device may utilize the associated memory and/or processor to determine availability of a configuration file including updates to a current configuration of a client application installed on the user device, as discussed elsewhere herein.

As shown by reference numeral 420, process 400 may include obtaining, by the user device, the configuration file based at least in part on determining that the configuration file including the updates is available. For instance, the user device may utilize the associated memory and/or processor to obtain the configuration file based at least in part on determining that the configuration file including the updates is available, as discussed elsewhere herein.

As shown by reference numeral 430, process 400 may include selectively adopting, by the user device, the updates included in the configuration file to update the current configuration of the client application. For instance, the user device may utilize the associated memory and/or processor to selectively adopt, the updates included in the configuration file to update the current configuration of the client application, as discussed elsewhere herein.

Process 400 may include additional aspects, such as any single aspect or any combination of aspects described below and/or in connection with one or more other processes described elsewhere herein.

In a first aspect, in process 400, the updates include respective updates associated with respective operating systems utilized by user devices associated with the infrastructure device.

In a second aspect, alone or in combination with the first aspect, in process 400, determining availability of the configuration file includes periodically determining availability of the configuration file.

In a third aspect, alone or in combination with the first through second aspects, in process 400, determining availability of the configuration file includes comparing a calculated hash value associated with the current configuration of the client application with a stored hash value associated with the configuration file.

In a fourth aspect, alone or in combination with the first through third aspects, process 400 may include determining that the configuration file is available based at least in part on determining that a calculated hash value associated with the current configuration of the client application fails to match a stored hash value associated with the configuration file.

In a fifth aspect, alone or in combination with the first through fourth aspects, in process 400, selectively adopting the updates includes adopting an update associated with an operating system being utilized by the user device.

In a sixth aspect, alone or in combination with the first through fifth aspects, in process 400, selectively adopting the updates includes adding or modifying a parameter associated with the current configuration of the client application.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

Figure 5:
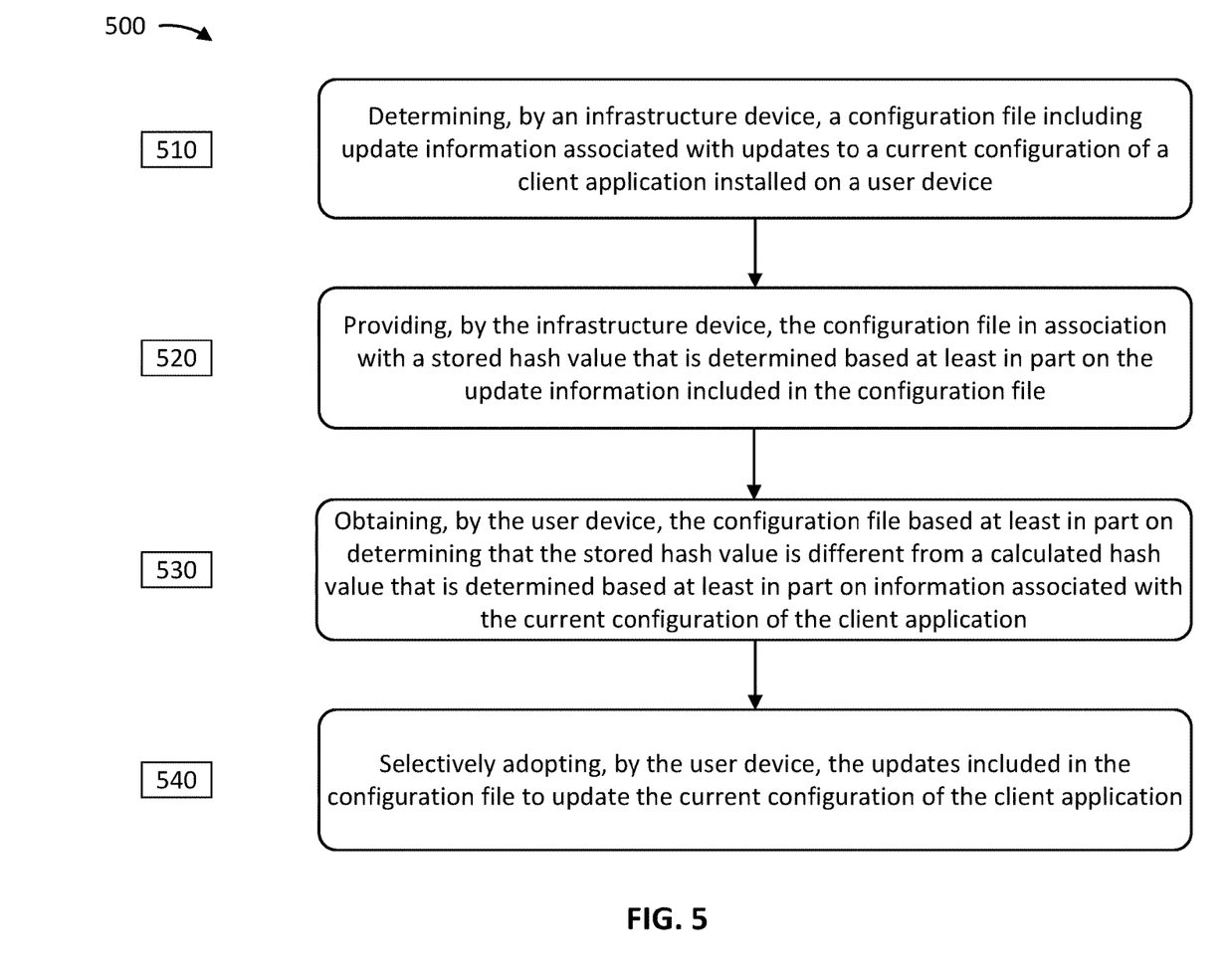
FIG. 5 is an illustration of an example process associated with optimized updating of a client application, according to various aspects of the present disclosure.

FIG. 5 is an illustration of an example process 500 associated with optimized updating of a client application, according to various aspects of the present disclosure. In some aspects, the process 500 may be performed by a memory and/or processor (e.g., processing unit 110, processor 620) associated with an infrastructure device (e.g., management device 108) and/or by a memory and/or processor (e.g., processing unit 116, processor 620) associated with a user device (e.g., user device 102). As shown by reference numeral 510, process 500 may include determining, by an infrastructure device, a configuration file including update information associated with updates to a current configuration of a client application installed on a user device. For instance, the infrastructure device may utilize the associated memory and/or processor to determine a configuration file including update information associated with updates to a current configuration of a client application installed on a user device, as discussed elsewhere herein.

As shown by reference numeral 520, process 500 may include providing, by the infrastructure device, the configuration file in association with a stored hash value that is determined based at least in part on the update information included in the configuration file. For instance, the infrastructure device may utilize the associated memory and/or processor to provide the configuration file in association with a stored hash value that is determined based at least in part on the update information included in the configuration file, as discussed elsewhere herein.

As shown by reference numeral 530, process 500 may include obtaining, by the user device, the configuration file based at least in part on determining that the stored hash value is different from a calculated hash value that is determined based at least in part on information associated with the current configuration of the client application. For instance, the user device may utilize the associated memory and/or processor to obtain the configuration file based at least in part on determining that the stored hash value is different from a calculated hash value that is determined based at least in part on information associated with the current configuration of the client application, as discussed elsewhere herein.

As shown by reference numeral 540, process 500 may include selectively adopting, by the user device, the updates included in the configuration file to update the current configuration of the client application. For instance, the user device may utilize the memory and/or processor to selectively adopt the updates included in the configuration file to update the current configuration of the client application, as discussed elsewhere herein.

Process 500 may include additional aspects, such as any single aspect or any combination of aspects described below and/or in connection with one or more other processes described elsewhere herein.

In a first aspect, in process 500, the updates include respective updates associated with respective operating systems utilized by user devices associated with the infrastructure device.

In a second aspect, alone or in combination with the first aspect, in process 500, providing the configuration file in association with the stored hash value includes storing the configuration file in association with the stored hash value in a storage device accessible by the user device.

In a third aspect, alone or in combination with the first through second aspects, in process 500, providing the configuration file includes transmitting, by the infrastructure device to the user device, communication information associated with a storage device that stores the configuration file to enable the user device to obtain the configuration file.

In a fourth aspect, alone or in combination with the first through third aspects, in process 500, selectively adopting the updates includes adopting an update associated with an operating system being utilized by the user device.

In a fifth aspect, alone or in combination with the first through fourth aspects, in process 500, selectively adopting the updates includes adding or modifying a parameter associated with the current configuration of the client application.

In a sixth aspect, alone or in combination with the first through fifth aspects, process 500 may include periodically determining, by the user device, availability of the configuration file.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of example devices 600 associated with optimized updating of a client application, according to various aspects of the present disclosure. In some aspects, the example devices 600 may form part of or implement the systems, servers, environments, infrastructures, components, devices, or the like described elsewhere herein (e.g., SP control infrastructure, user device, etc.) and may be used to perform example processes described elsewhere herein. The example devices 600 may include a universal bus 610 communicatively coupling a processor 620, a memory 630, a storage component 640, an input component 650, an output component 660, and a communication interface 670.

Bus 610 may include a component that permits communication among multiple components of a device 600. Processor 620 may be implemented in hardware, firmware, and/or a combination of hardware and software. Processor 620 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 620 may include one or more processors capable of being programmed to perform a function. Memory 630 may include a random access memory (RAM), a read only memory (ROM), and/or another type of dynamic or static storage device (e.g., a flash memory, a magnetic memory, and/or an optical memory) that stores information and/or instructions for use by processor 620.

Storage component 640 may store information and/or software related to the operation and use of a device 600. For example, storage component 640 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 650 may include a component that permits a device 600 to receive information, such as via user input (e.g., a touch screen display, a keyboard, a keypad, a mouse, a button, a switch, and/or a microphone). Additionally, or alternatively, input component 650 may include a component for determining location (e.g., a global positioning system (GPS) component) and/or a sensor (e.g., an accelerometer, a gyroscope, an actuator, another type of positional or environmental sensor, and/or the like). Output component 660 may include a component that provides output information from device 600 (via, for example, a display, a speaker, a haptic feedback component, an audio or visual indicator, and/or the like).

Communication interface 670 may include a transceiver-like component (e.g., a transceiver, a separate receiver, a separate transmitter, and/or the like) that enables a device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, a radio frequency (RF) interface, a universal serial bus (USB) interface, a Wi-Fi interface, a cellular network interface, and/or the like.

A device 600 may perform one or more processes described elsewhere herein. A device 600 may perform these processes based on processor 620 executing software instructions stored by a non-transitory computer-readable medium, such as memory 630 and/or storage component 640. As used herein, the term "computer-readable medium" may refer to a non-transitory memory device. A memory device may include memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 6 are provided as an example. In practice, a device 600 may include additional components, fewer components, different components, or differently arranged components than those shown in FIG. 6. Additionally, or alternatively, a set of components (e.g., one or more components) of a device 600 may perform one or more functions described as being performed by another set of components of a device 600.

As indicated above, FIG. 6 is provided as an example. Other examples may differ from what is described with regard to FIG. 6.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" or "device" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   determining, by a user device, availability of a configuration file including updates to a current configuration of a client application installed on the user device, determining the availability including determining, by the user device, that the configuration file is available based at least in part on determining that a calculated hash value associated with the current configuration of the client application fails to match a stored hash value associated with the configuration file;
   obtaining, by the user device, the configuration file based at least in part on determining that the configuration file including the updates is available; and
   selectively adopting, by the user device, the updates included in the configuration file to update the current configuration of the client application, selectively adopting the updates includes adopting an update associated with an operating system being utilized by the user device, and adding or modifying a parameter associated with the current configuration of the client application.

2. The method of claim 1, wherein the updates include respective updates associated with respective operating systems utilized by user devices associated with an infrastructure device.

3. The method of claim 1, wherein determining availability of the configuration file includes periodically determining availability of the configuration file.

4. The method of claim 1, wherein determining availability of the configuration file includes comparing the calculated hash value associated with the current configuration of the client application with the stored hash value associated with the configuration file.

5. The method of claim 1, further comprising:
obtaining the stored hash value associated with the configuration file.

6. The method of claim 1, further comprising:
accessing the configuration file stored in association with the stored hash value in a storage device.

7. The method of claim 1, further comprising:
receiving communication information associated with a storage device that stores the configuration file to enable the user device to obtain the configuration file.

8. A user device, comprising:
a memory; and
a processor communicatively coupled with the memory, the memory and the processor being configured to:
  determine availability of a configuration file including updates to a current configuration of a client application installed on the user device, wherein the memory and the processor are configured to determine that the configuration file is available based at least in part on determining, by the memory and the processor, that a calculated hash value associated with the current configuration of the client application fails to match a stored hash value associated with the configuration file;
  obtain the configuration file based at least in part on determining that the configuration file including the updates is available; and
  selectively adopt the updates included in the configuration file to update the current configuration of the client application, wherein the memory and the processor are configured to adopt an update associated with an operating system being utilized by the user device, and to add or modify a parameter associated with the current configuration of the client application.

9. The user device of claim 8, wherein the updates include respective updates associated with respective operating systems utilized by user devices associated with an infrastructure device.

10. The user device of claim 8, wherein, to determine availability of the configuration file, the memory and the processor are configured to periodically determine availability of the configuration file.

11. The user device of claim 8, wherein, to determine availability of the configuration file, the memory and the processor are configured to compare the calculated hash value associated with the current configuration of the client application with the stored hash value associated with the configuration file.

12. The user device of claim 8, wherein, the memory and the processor are configured to obtain the stored hash value associated with the configuration file.

13. The user device of claim 8, wherein the memory and the processor are configured to access the configuration file stored in association with the stored hash value in a storage device.

14. The user device of claim 8, wherein the memory and the processor are configured to receive communication information associated with a storage device that stores the configuration file.

15. A non-transitory computer-readable medium configured to store instructions, which when executed by a processor associated with a user device, cause the processor to:
  determine availability of a configuration file including updates to a current configuration of a client application installed on the user device, wherein the processor is configured to determine that the configuration file is available based at least in part on determining, by the processor, that a calculated hash value associated with the current configuration of the client application fails to match a stored hash value associated with the configuration file;
  obtain the configuration file based at least in part on determining that the configuration file including the updates is available; and
  selectively adopt the updates included in the configuration file to update the current configuration of the client application, wherein the processor is configured to adopt an update associated with an operating system being utilized by the user device, and to add or modify a parameter associated with the current configuration of the client application.

16. The non-transitory computer-readable medium of claim 15, wherein the updates include respective updates associated with respective operating systems utilized by user devices associated with an infrastructure device.

17. The non-transitory computer-readable medium of claim 15, wherein, to determine availability of the configuration file, the processor is configured to periodically determine availability of the configuration file.

18. The non-transitory computer-readable medium of claim 15, wherein, to determine availability of the configuration file, the processor is configured to compare the calculated hash value associated with the current configuration of the client application with the stored hash value associated with the configuration file.

19. The non-transitory computer-readable medium of claim 15, wherein, the processor is configured to obtain the stored hash value associated with the configuration file.

20. The non-transitory computer-readable medium of claim 15, wherein the processor is configured to access the configuration file stored in association with the stored hash value in a storage device, or to receive communication information associated with a storage device that stores the configuration file.

* * * * *